April 18, 1939.   M. B. COOKE ET AL   2,154,493
METHOD OF DEASPHALTING AND DEWAXING HYDROCARBON OILS
Filed Feb. 21, 1935
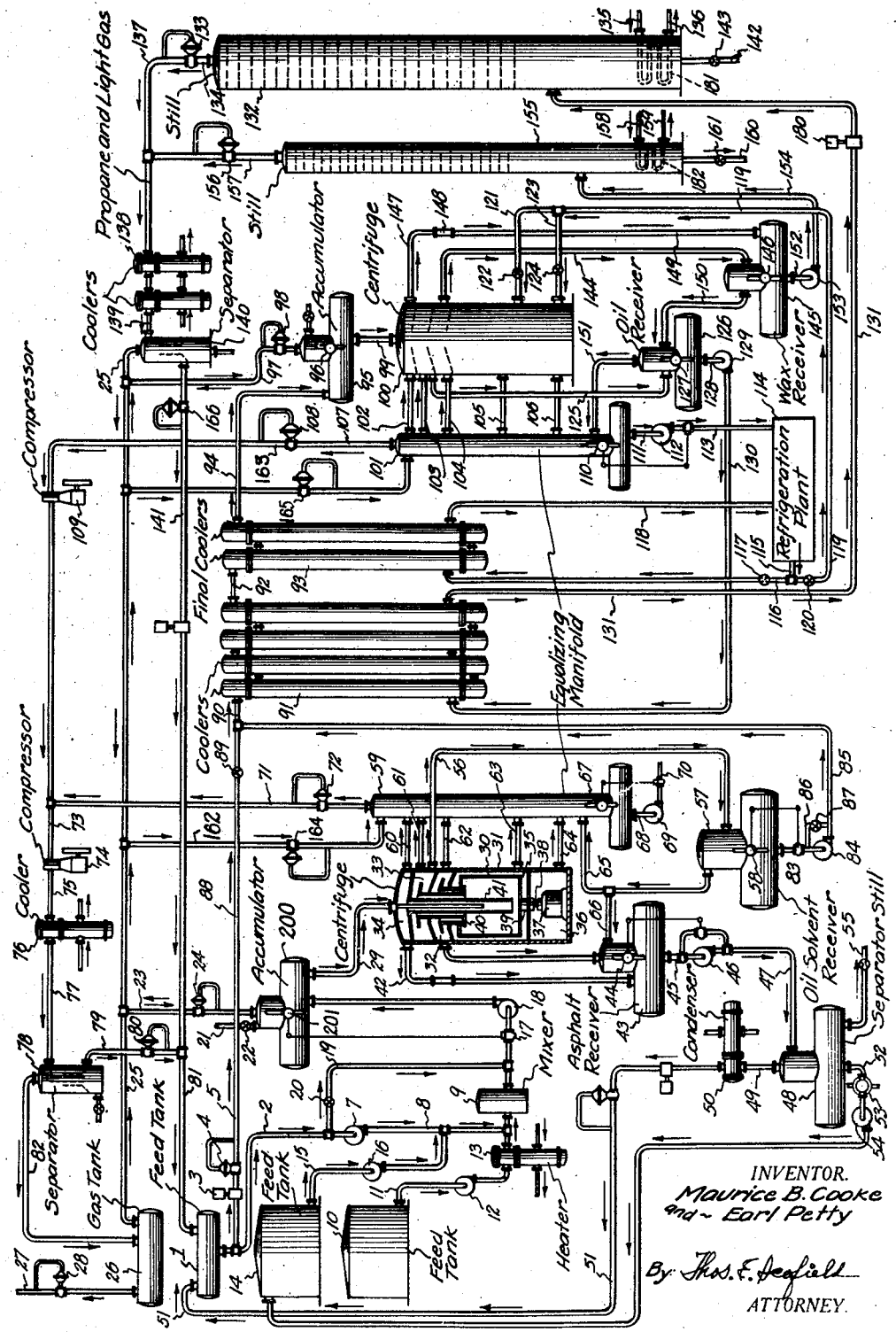
INVENTOR.
Maurice B. Cooke
and ~ Earl Petty
By Thos. E. Scofield
ATTORNEY.

Patented Apr. 18, 1939

2,154,493

UNITED STATES PATENT OFFICE 2,154,493

METHOD OF DEASPHALTING AND DEWAXING HYDROCARBON OILS

Maurice B. Cooke, Plainfield, N. J., and Earl Petty, Scarsdale, N. Y., assignors, by mesne assignments, to Sun Oil Company, Philadelphia, Pa., a corporation of New Jersey Application February 21, 1935, Serial No. 7,518

14 Claims. (Cl. 196—13)

This invention relates to the deasphalting and dewaxing of hydrocarbon oils and more particularly to wax and asphalt removal processes wherein a solvent having an anti-solvent effect on asphalt at normal temperatures, on wax at low temperatures and a solvent effect on the oil throughout the dewaxing temperatures is used to facilitate the removal.

In the asphalt separation processes known in the art, liquefied normally gaseous hydrocarbons have been found to be efficacious as oil solvents which will readily precipitate asphalt at a normal temperature of, for example, 80° F. The separation of the precipitated asphalt is most commonly accomplished by gravity settling as a batch operation which operation depends for efficiency upon the requirement that the liquid be in a non-agitated state and the viscosity of the solution be low in order that the effect of gravity may be made of use to cause settling within a reasonable period of time. The volume of solvent necessary to accomplish this is high and this liquid burden is disadvantageous from the standpoint of solvent recovery from the extract oil phase and from the asphalt phase.

The separation of the wax from the deasphaltized oil with the same solvents has presented similar difficulties and others of a different character. In the dewaxing processes of the discontinuous or batch type, utilizing a normally gaseous solvent, it is necessary to chill the solution to temperatures below that at which crystallization of the wax may take place. When auto-refrigeration is practiced, good crystallization of the wax can only be obtained at or below the boiling point of the liquid by bringing about a state of quiescence in the liquid. In those cases where partial evaporation of the solvent has been practiced, with attendant refrigeration effect, the crystals formed at higher temperatures are destroyed by the boiling liquid and are only recrystallized after bringing the liquid to rest at a temperature pressure equilibrium below the boiling point of the solvent. With heat absorption by propane, agitation occurs and convection currents are set up which distribute the heat to the entire liquid body resulting in a change of state which destroys by minute dispersion and re-solution the wax crystals formed. Therefore, to obtain complete crystallization of the wax from the solution, the entire solution must be sub-cooled considerably below the temperature at which all wax would have been crystallized from a quiescent solution.

We have found that by carrying on the entire chilling operation by indirect heat exchange at pressures substantially above the equilibrium pressure of the liquid during chilling, for example, 100 lbs. per square inch, or more, the crystals can be developed in the state, or as of the state of a true liquid at temperatures elevated above those customary where auto-refrigeration is practiced. If the operation of sub-cooling by evaporation is practiced, as in conventional processes, a refrigeration cost results which is out of line with that for other solvents such as ethylene dichloride or acetone benzol, for example, where crystallization takes place in a quiescent liquid phase at elevated temperatures above the boiling point of the solvent. If auto-refrigeration is practiced it means that special evaporators and control of concentration of the solvent is required in order to establish a crystal that will provide for suitable yields even at temperatures of —45° F., or lower, as is the case when propane, for example, is used as the solvent.

From an analogous viewpoint, experiments with the conventional centrifuge using a liquefied normally gaseous hydrocarbon solvent, such as propane, chilled to a temperature of, for example, —45° F., that is, equilibrium temperature at atmospheric pressure, have given negative results and indications. The heat of friction at the bowl wall resulting in a temperature rise will cause boiling of the propane and crystal destruction. If the material is sub-cooled to overcome this boiling, the crystals become too firm and solid, resulting in a bowl cake difficult to discharge. Even then, the friction may cause evaporation resulting in drying and hardening of the cake and at the same time interfering with separation due to vapor disturbances in passing through the liquid.

We have found that these disadvantages with respect to centrifugal operation may be overcome by conducting the centrifuging operation while maintaining the liquid being centrifuged under a pressure substantially above the equilibrium pressure of the solvent in the solution, for example, maintaining a pressure of 100 lbs. per square inch on the solution at 0° to —20° F.

It is one object of our invention to provide a process for deasphalting hydrocarbon oils with a normally gaseous hydrocarbon solvent which will materially reduce the quantity of solvent required to effect the separation.

It is another object of our invention to provide a process for deasphalting hydrocarbon oils with a normally gaseous hydrocarbon solvent which will materially reduce the time required to separate the asphalt from the oil.

It is a further object of our invention to provide a process for deasphalting hydrocarbon oils with a normally gaseous hydrocarbon solvent which will permit rapid continuous separation of the asphalt from the oil by means of high speed centrifuges.

It is a further object of our invention to provide a process for deasphalting hydrocarbon oils with a normally gaseous hydrocarbon solvent in which the ease of separation is aided by the presence of a non-miscible liquid.

It is a further object of our invention to provide a process for dewaxing hydrocarbon oils with a normally gaseous hydrocarbon solvent by which the wax separation may be made at temperatures substantially above those customary with such solvents.

It is a further object of this invention to provide a process for dewaxing hydrocarbon oils with a normally gaseous hydrocarbon solvent which will permit continuous centrifugal separation of the wax in a plastic form without vaporization of the solvent by friction against the bowl wall and hardening of the wax on the bowl wall.

It is a further object of our invention to provide a process for dewaxing hydrocarbon oils with a normally gaseous hydrocarbon solvent in which the wax crystals will be formed in the oil solvent solution in the absence of boiling of the solution.

It is a further object of our invention to provide a process for removing wax and asphalt from a hydrocarbon oil by centrifugal separation of these constituents from a solution of the oil in a liquefied normally gaseous hydrocarbon solvent.

It is a still further object of our invention to provide a new and useful combination of apparatus capable of carrying out the process of deasphalting and/or dewaxing according to our invention.

The accompanying drawing which is a schematic showing in elevation (with parts in section) of one form of apparatus capable of carrying out the process of our invention forms part of the instant specification and is to be read in conjunction therewith.

In general, we form a solution of hydrocarbon oil containing wax and asphalt with a liquefied normally gaseous hydrocarbon solvent such as propane. To this solution there is added if desired a non-miscible liquid such as water and/or other emulsifying agent, the oil solvent solution then being pumped to an accumulator or pressuring chamber in which a pressure is maintained on the solution greater than the vapor pressure of the solvent at its temperature in the solution by hydrostatic means, or by a gas substantially insoluble in the liquid at this pressure and having a vapor pressure higher than that of the solvent at the same temperature. The solution containing asphalt precipitated by the solvent is then fed under this pressure directly to a high speed centrifuge wherein a separation of an asphalt-water-solvent phase from the oil-solvent phase is effected. This separating operation is carried on under a pressure slightly reduced from that in the accumulator (say 10 lbs. per square inch reduction) to permit liquid flow, the centrifuge still being subjected, however, to a pressure greater than the equilibrium pressure of the solvent at the temperature of the solvent in the centrifuge by means of a gaseous fluid substantially insoluble in the liquid and having a vapor pressure higher than that of the solvent at the same temperature.

The asphalt phase is discharged by gravity from the centrifuge into a receiver maintained under the same pressure as exists in the centrifuge by means of the same gaseous fluid acting through an equalizing manifold connecting the receiver and centrifuge. This pressure is lower than the pressure in the accumulator from which the solution is fed to the centrifuge. The asphalt phase is withdrawn from this receiver, pumped to a separator still wherein the solvent is distilled from the asphalt and returned to the solvent feed tank, while the water or other emulsifying agent separated from the asphalt by the distillation operation is returned to the non-miscible liquid feed tank. The asphalt free of emulsifying agent and solvent is withdrawn from the separator still and pumped to storage.

The oil-solvent phase, discharged from the centrifuge, flows by gravity into a separate receiver whose contents are maintained under the same gas pressure as exists in the centrifuge and the asphalt phase receiver by means of the equalizing manifold. The oil solution in this receiver is continuously withdrawn therefrom by means of a level-controlled metering pump, diluted with additional solvent if necessary and then passed at a pressure greater than the equilibrium pressure of the solvent during passage, through a series of indirect heat exchangers wherein the solution is chilled to a temperature sufficiently low to precipitate or crystallize the wax, the chilled solution then being passed to a second accumulator or pressuring chamber where the solution is maintained under a pressure such as has been previously described in respect to the first accumulator but somewhat lower due to the pressure drop through the exchangers and the somewhat lower equilibrium pressure of the solution at the chilled temperature.

The solution containing the crystallized wax is then fed under this pressure to a separate centrifuge wherein a separation of a wax solvent phase from the oil solution is made. The centrifuge is also operated in this case under a pressure greater than the pressure of the solvent at its temperature in the centrifuge by means of a gaseous fluid having a vapor pressure higher than that of the solvent at the same temperature. As in the case of the deasphalting centrifuge, however, this pressure is slightly reduced from that existing in the accumulator. The wax solvent phase discharged from the centrifuge is permitted to flow under gravity into a wax receiver maintained at the same absolute pressure as exists in the centrifuge by means of an equalizing manifold connecting the centrifuge and receiver. The wax phase is continuously pumped from this receiver to a still in which the solvent is distilled from the wax under a pressure sufficiently high so that the solvent vapors may be liquefied at this pressure with the available cooling water and returned to the solvent feed tank.

The oil-solvent phase discharged from this centrifuge is permitted to flow under gravity into an oil receiver in which the same absolute pressure, as exists in the centrifuge and wax phase receiver, is maintained through connection to the equalizing manifold. The oil-solvent solution in this receiver is continuously withdrawn therefrom and pumped through the exchanger-coolers in indirect heat exchange with the asphalt-free oil-solvent solution being chilled. The wax-free oil-solvent phase upon leaving the exchanger-coolers is passed to a separate still wherein the solvent vapors are distilled from the oil under a pressure sufficient to permit liquefaction of the solvent vapors upon cooling with the available cooling water. The solvent-free oil withdrawn from the still will be a substantially asphalt and wax-free oil of the desired low cold-test and color.

Any of the light gas used as the pressuring medium which dissolves in the oil-solvent solution during the centrifuging or other operations will be distilled from the oil and wax with the solvent vapors and not being condensible at these temperatures and pressures is returned as a gas under substantially its initial pressure to the pressure gas feed tank. This tank is connected by means of suitable piping, pressure regulators and equalizing manifolds to both centrifuges and to the various oil and wax receiver and accumulators so that it is possible to maintain throughout the entire wax asphalt separating system an absolute pressure on the contents of the system greater than the equilibrium pressure of the solvent at its temperature at any point in the system and at the same time provide for pressure drop control interstage.

A refrigeration plant of any suitable design is provided to supply a cooling medium for circulating through the exchanger coolers and for spraying into the bowl and motor compartments of the centrifuge to maintain the motor and bowl at a temperature sufficiently low to inhibit any tendency to cause vaporization of the solvent from heating due to movement of the operating parts.

Referring now more particularly to the drawing, solvent propane is withdrawn from the feed tank 1 where it is maintained as a liquid at a pressure of about 150 lbs. per square inch and passed through a line 2 to the metering charge pump 7. It is, however, within the contemplation of our invention to use other liquefied normally gaseous hydrocarbon solvents, for example, butane, n-butane, isobutane, alone or in combination with each other, or with propane.

The metering pump 7 discharges the solvent through the manifold 8 into a mixing device 9 provided with, if desired, suitable mechanically-driven agitating devices; or merely with baffles (not shown). At the same time a hydrocarbon oil containing wax and asphalt is withdrawn from a feed tank 10 through a line 11 and forced by means of an oil metering pump 12 through a heater 13 of any suitable form to the manifold 8. Similarly, a fluid such as water non-miscible with the oil and solvent and having emulsifying properties with the asphalt is withdrawn from a feed tank 14 and passes through the line 15 to the water metering pump 16 by which it is discharged into the manifold 8. The ratio of solvent to oil is such as will just cause precipitation of substantially all of the asphalt content in the oil. This ratio will be, for example, in the case of a topped East Texas crude, 4 to 5 parts of solvent to 1 part of oil.

Similarly, we have found that, in general, 1 part of water when added to 10 parts of the oil will materially aid in the separation of the asphalt from the oil. The solution formed in the mixer 9, which will generally be at a temperature in the neighborhood of 80° F., is withdrawn therefrom through a pump suction line 17 connected to the solution metering pump 18. A solvent makeup line 19, controlled by a valve 20, connects the solvent feed line 6 to the pump suction line 17 of the mixer 9 in order that additional solvent may be added to the solution if it is deemed necessary. The pump 18 delivers the solution which now contains precipitated asphalt as a finely divided slurry to the accumulator 200 in which a constant liquid level is maintained by means of a liquid level control device 201.

The accumulator 200, the upper portion of which forms a gas dome, is provided with a vent line 21 having a pressure relief valve 22. A pressure gas line 23 having a pressure regulator 24 connects the accumulator 200 with a high pressure gas line 25 leading from a pressure gas tank 26.

The tank 26 having a vent line 27 provided with a pressure regulator 28 serves as a storage means for a gaseous fluid by which a pressure may be maintained on the surface of the liquid in the receiver 200 greater than the equilibrium pressure of the solvent in the solution at the temperature of the solution in the accumulator 200. In the practice of our invention where propane is utilized as a solvent, we prefer to use a normally gaseous hydrocarbon lighter than propane, such as ethane, for example.

If ethane is used, it is desirable that the pressure regulator 24 be so adjusted that a gas pressure of approximately 200 lbs. per square inch existing in the tank 26 be transmitted through the lines 25 and 23 to the contents of the accumulator 200. Generally speaking, it is desirable that the gas used be substantially insoluble in the liquefied solvent and that the pressure of the gas be substantially above the equilibrium pressure of the solvent at the solvent temperature wherever the gas pressure is applied. Any gas, therefore, having a vapor pressure higher than that of the solvent at the same temperature will be suitable for the practice of our process. Alternatively, however, it is within the contemplation of our invention to subject the solution in the accumulator to a hydrostatic pressure.

The oil solvent solution containing precipitated asphalt with which latter there is associated the non-miscible fluid, which appears to form with the asphalt an emulsion providing an extended surface area, is forced under the pressure head in the accumulator 200 through the line 29 into the bowl 30 of the centrifuge generally indicated as 31.

The centrifuge 31, though in the main of conventional construction with the usual heavy component discharge chamber 32, light component discharge chamber 33, overflow chamber 34, bowl chamber 35 and motor chamber 36 containing motor 37 driving the bowl 30 through the shaft 38 passing through the bearing 39, is specifically constructed so as to permit the maintenance within its shell of a relatively high gas pressure. This pressure will be slightly reduced from that in the accumulator 200 (say by 10 lbs. per square inch) to secure an effective rate of flow through the centrifuge. The motor may drive the bowl directly as we have shown or be arranged externally of the centrifuge and drive the bowl through suitably designed bearings for operating under this pressure condition. Where a direct drive is used as shown, the motor 37, though forming of itself no part of our invention, is so constructed as to be capable of running in a bath of liquid, for example liquid propane, or a gas atmosphere. The bearing 39 through which the bowl driving shaft 38 passes is so constructed as to permit a certain amount of freedom of movement of the shaft which, at the operating speeds used, has a radius of gyration which must be compensated for.

The oil solvent solution entering the bowl 30 through the line 29 separates under the action of centrifugal force into an asphalt phase which passes up through the channel formed by the bowl 30 and the separator disc 40 and is collected in the heavy component or asphalt phase chamber 32. The oil solvent solution free of asphalt passes up through the channel formed by the center tube 41 of the centrifuge and the separator disc 40 into the light component or oil solvent collecting chamber 33 of the centrifuge. The asphalt phase with which is associated the non-miscible fluid forming with the asphalt an emulsion, discharges by gravity flow through the line 42 into an asphalt receiver 43, which is provided with a liquid level control device 44 serving to maintain a constant liquid level in the receiver 43. The asphalt is withdrawn through the line 45 by means of a pump 46 controlled by the level controller 44 and discharged through the line 47 into a separator still 48. Suitable heating means (not shown) are provided in this still and serve to strip the solvent from the asphalt, the solvent vapors passing overhead through the line 49 to the condenser 50 wherein they are cooled and liquefied and from which the liquefied solvent returns through the line 51 to the solvent feed tank 1. The emulsion of asphalt and water is also broken in the still 48, the water being removed from the still through the line 52 by means of a pump 53 which returns the water through the line 54 to the non-miscible fluid feed tank 14. The asphalt now free of solvent and water is removed from the still through the line 55 and passed to storage tanks (not shown).

The light component which, in this case, will be the oil solvent solution free of asphalt, is discharged from the chamber 33 and is permitted to flow under the action of gravity through the line 56 into a separate intermediate receiver 57 which is likewise provided with a liquid level control device 58 serving to maintain a constant liquid level in the receiver.

In the operation of this centrifuge, it is necessary to maintain at all times on the contents a gas pressure which will be substantially above the equilibrium pressure of the solvent at its temperature in the centrifuge. We have accomplished this by providing an equalizing manifold 59 which is connected to the overflow chamber 34 of the centrifuge by means of the line 60, to the light component collecting chamber 33 by means of the line 61, to the heavy component collecting chamber 32 by means of the line 62, to the chamber 35 surrounding the bowl 30 by means of the line 63, and to motor chamber 36 by means of the line 64. This manifold is also connected by means of the line 65 to the oil solvent receiver 57, a branch line 66 joining the asphalt receiver 43 with the equalizing line 65. The manifold 59 is provided with a liquid level control device 67 which limits the amount of liquid accumulating in the manifold. This liquid may be removed through the line 68 by means of a pump 69 which discharges through the line 70.

The manifold 59 has its upper portion joined by means of a gas line 71 having a pressure regulator 72 with a line 73 connected to the section side of a gas compressor 74. The compressed gaseous fluid discharged from this compressor passes through the line 75, cooler 76 and line 77 to a separator 78. This separator serves to remove any solvent liquefied by the compression and cooling, the solvent being returned through the line 79 in which is interposed a back pressure control valve 80 to the line 81 connected to the solvent feed tank 1. The light gas free of the solvent passes from the separator 78 through the line 82 to the light gas feed tank 26.

It will be observed that by means of the equalizing manifold 59 connected through the line 71 to the pressure gas line 73, it is possible to maintain the contents of the centrifuge 31 and the contents of the receivers 43 and 57 under the same absolute pressure. This may be controlled by the pressure regulator 72 in the line 71 so that the light gas pressure in this system may be in the order of, for example, 190 lbs. per square inch, which will be sufficient to prevent any vaporization of the solvent in the centrifuge or in the receivers even with the slight pressure drop of say 10 lbs. per square inch between the accumulator and receivers.

The asphalt-free oil solvent solution is discharged under this pressure from the receiver 57 through the line 83 to the suction side of the metering pump 84 which discharges into the line 85. In the event that it becomes unnecessary to use the hydraulic head furnished by the pump 84, the solution may be by-passed from the line 83 through the line 86 in which is located the valve 87. The flow through either the pump 84 or by-pass line 86 is controlled in either case, however, by the liquid level control 58 in the receiver 57. Additional solvent may be added to the solution in the line 85 by means of the line 88 through manipulation of the valve 89. Solvent for this purpose is forced under a pressure of approximately 200 lbs. per square inch through the line 88 by means of the pump 3 whose discharge is controlled by the pressure regulator 4, the suction side of the pump being connected to the solvent feed line 2 by means of the line 5. The diluted solution then passes under this pressure through the line 90 to a first group of indirect exchanger coolers 91 from which the partially chilled solution passes through the line 92 to the final indirect exchanger coolers 93. It is to be noted that the solution during chilling is still maintained under a pressure greater than the equilibrium pressure of the solvent at its temperature during the chilling. Since no vaporization of the solvent can occur under these conditions, complete final crystallization of substantially all of the wax in the oil is secured with a final temperature considerably above that necessary where auto-refrigeration is used as a mode of chilling since no boiling of the solution with attendant crystal destruction occurs. This final temperature usually will lie between —20° F. and 0° F.

The chilled mixture of crystallized wax and oil solvent solution leaves the final coolers 93 through the line 94 and passes to an accumulator 95 wherein a constant liquid level is maintained by means of the liquid level control device 96. The upper portion of the accumulator 95 is constructed to provide a gas dome above the liquid level and is connected by means of a line 97 in which is located a pressure regulator 98 to the high pressure gas line 25 joining the pressure gas tank 26. The pressure regulator 98 will usually be adjusted to permit the maintenance of a gas pressure within the accumulator 95 of 100 lbs. per square inch when ethane is used as the pressuring medium and propane is used as a solvent. It will be observed that a certain amount of pressure drop, in this case about 90 lbs. per square inch, takes place between the receiver 57 and the accumulator 95 due to passage through the exchanger coolers and reduction in solvent vapor pressure as the result of temperature decrease.

The oil-solvent solution containing the crystallized wax is delivered under the gas pressure head in the accumulator 95 through the line 99 to the bowl (not shown) of the dewaxing centrifuge 100. This centrifuge is analogous to the deasphalting centrifuge 31 and the overflow, light component, heavy component, bowl and motor chambers are connected to an equalizing manifold 101 by means of the lines 102, 103, 104, 105 and 106 respectively.

Each of the manifolds 59 and 101 is connected by means of lines 162 and 163 respectively to the pressure gas line 25 through pressure reducing valves 164 and 165 respectively in order that pressures of 190 lbs. per square inch and 90 lbs. per square inch respectively will be maintained in these manifolds.

The upper portion of the equalizing manifold 101 is connected by means of a line 107 in which is located a pressure regulator 108 to the suction side of a low stage compressor 109 whose pressure side is connected by means of the line 73, as has been previously pointed out, to the suction side of the high stage compressor 74. Liquid collecting in the bottom of the manifold 101 is maintained at a constant level by means of a liquid level control device 110 while the liquid which accumulates and which may be, for example, cooling liquid such as brine, solvent, is withdrawn through the line 111 by means of the pump 112 and discharged from the line 113 to a refrigerating plant generally indicated as 114.

The refrigeration plant 114 provides a cooling medium such as brine which is passed through the line 115 and fed in whole or in part, depending upon the refrigeration load required, through the line 116 having a valve 117 to the final coolers 93 from which the cooling medium discharges through the line 118 and returns to the refrigeration plant 114. A portion of the cooling medium from the line 115 may be passed through a branch line 119 having a valve 120 and utilized as a cooling means for controlling temperatures in the bowl chamber of the centrifuge 100 through the line 121 in which is located a control valve 122. Similarly, a portion of this cooling medium may be utilized as a cooling means for controlling the temperature of the motor of the centrifuge 100 through the line 123 having a control valve 124. By this means we are enabled to prevent any temperature rise of the bowl or motor during operation and thus control any tendency to vaporization of the solvent which might otherwise exist as the result of heating due to friction. Any liquid which accumulates in the base of the centrifuge will flow through the equalizing line 106 to the equalizing manifold 101 from which it may be returned through the line 113 to the refrigeration plant 114.

The light component which in this case is the wax-free oil solvent solution is discharged from the centrifuge through the line 125 and flows under gravity into the receiver 126 provided with a liquid level control device 127 serving to maintain a constant liquid level in the receiver whose upper portion is so constructed as to provide a gas dome above the liquid contents. The oil solvent solution is withdrawn from the receiver 126 through the line 128 and discharged by means of the pump 129 through the line 130 to the first group of exchanger coolers where by indirect heat exchange it serves to extract heat from the warm oil solvent solution undergoing chilling. The wax-free oil solvent solution issuing from the coolers 91 passes through the line 131 and is delivered under the pressure of the pump 129 or an auxiliary booster pump 180 into a still 132.

The still 132 is operated under a pressure of, for example, 250 to 300 lbs. per square inch maintained by a pressure regulating valve 133 in the vapor discharge line 134, the pressure being built up by the solvent vapors distilled from the oil as the result of heat exchange from a heating medium passing through a closed coil 181 in the still, which medium is introduced through the line 135 and removed through the line 136. The solvent vapors stripped from the oil issue from the still through the line 134 and pass through a line 137 and coolers 138 wherein the temperature reduction of the vapors, due to the normal available cooling water, is sufficient to liquefy the vapors, the liquid issuing from the cooler 138 and passing through the line 139 to a light gas separator 140. In this separator any of the light gas which, at the existing pressure and temperature, will not be liquefied, is removed through the line 25 and returned to the light gas pressure feed tank 26. The liquefied solvent passes from the separator through the line 141 and pressure reducing valve 166 which joins the line 81 returning to the solvent feed tank.

The oil in the still 132 now free of solvent is withdrawn from the still through the line 142 in which is located a valve 143 and is passed to storage tanks (not shown) as an oil of the desired low cold test and color characteristics.

The heavy component, which in this case is the wax-solvent phase, issues from the centrifuge through the line 144 and flows by gravity into a receiver 145 provided with a liquid level control device 146 serving to maintain within the receiver a constant liquid level. The upper portion of the receiver is constructed so as to provide a gas dome above the liquid contents. The overflow chamber of the centrifuge is connected by means of a line 147 to a sight glass 148 from which a line 149 leads to the receiver 145. A similar overflow line is provided for the asphalt centrifuge 31.

The receivers 126 and 145 have their gas domes joined by means of an equalizing line 150 while the gas dome of the receiver 126 is also joined by means of an equalizing line 151 with the equalizing manifold 101. It will be observed that by this construction there will be maintained on the liquid contents of each of the receivers an absolute pressure of the same value as that existing within the interior of all parts of the centrifuge 100 and, as in that case, this pressure will be approximately 90 lbs. per square inch, i. e., with say a 10 lb. per square inch reduction for feed through the centrifuge or, more generally, a pressure greater than the equilibrium pressure of the solvent at its temperature in each of the receivers 126 and 145.

The wax-solvent phase accumulating in the receiver 145 issues therefrom through the line 152 and is forced by means of the pump 153 through the line 154 into a still 155 maintained at a pressure of from 250 to 300 lbs. per square inch by means of a pressure regulator 156 located in a solvent vapor discharge line 157. The vapor line 157 joins the line 137 and the solvent vapors are cooled and recovered in liquid form for re-use as has previously been pointed out in the operation of the still 132. A heating medium is supplied to a closed coil 182 in the still 155, being introduced to the coil through the line 158 and removed through the line 159.

The wax free of solvent is removed from the bottom of the still 155 through a line 160 having a control valve 161 and is passed to storage tanks (not shown).

It will be observed that we have accomplished the objects of our invention and have provided a process depending upon uninterrupted super-imposed pressure (at all times greater than the vapor pressure of the solution being processed) for deasphalting and dewaxing hydrocarbon oils which will permit rapid continuous separation of asphalt and wax by a centrifuging operation in which a liquefied normally gaseous solvent is used. We have provided a process not dependent upon auto-refrigeration and in which the liquid burden of solvent is reduced over that required for solvent asphalt separation processes heretofore known in the art. Also we have provided a process in which the dewaxing operation is carried out at a more elevated temperature resulting in a considerable saving in the refrigeration load while securing an oil of low cold test.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described the invention, what is claimed is:

1. A process for removing asphalt from hydrocarbon oils comprising forming a solution of an asphalt containing hydrocarbon oil with a normally gaseous solvent in such proportion as to precipitate insoluble asphalt from the oil, passing the solution containing insoluble asphalt under a pressure greater than the equilibrium pressure of the solvent at its temperature during passage to a separating zone and there centrifugally separating the asphalt from the solution while maintaining on the contents of the separating zone a pressure greater than the equilibrium pressure of the solvent at its temperature in the separating zone by means of a gaseous fluid having a vapor pressure higher than that of the solvent at the same temperature.

2. A process for removing asphalt from hydrocarbon oils comprising passing a solution of an asphalt containing oil in a normally gaseous solvent to a separating zone, said solution containing a non-miscible fluid and insoluble asphalt, and there centrifugally separating an asphalt phase from the solution while maintaining a pressure on the contents of the separating zone greater than the equilibrium pressure of the solvent at its temperature in the separating zone by means of a gaseous fluid having a vapor pressure greater than that of the solvent at the same temperature.

3. A process for removing asphalt from a hydrocarbon oil comprising forming a solution of an asphalt containing oil and a normally gaseous solvent in such proportions as will precipitate asphalt from the oil, passing the solution containing insoluble asphalt to a separating zone, subjecting the solution during its passage to the separating zone to a pressure greater than the equilibrium pressure of the solvent at its temperature during passage to the separating zone and centrifugally separating the asphalt from the solution in the separating zone while maintaining a pressure on the contents of the separating zone greater than the equilibrium pressure of the solvent at its temperature in the separating zone by means of a gas having a vapor pressure higher than the solvent at the same temperature.

4. The process of claim 3 including the step of adding a non-miscible fluid to the solution during the solution forming step.

5. The process of claim 3 in which propane is the normally gaseous solvent and in which a gas having greater vapor pressure then propane at the same temperature is used as the pressuring gas.

6. A process for removing asphalt from a hydrocarbon oil comprising passing to a separating zone a solution of oil in a liquefied normally gaseous solvent, said solution containing insoluble asphalt existing as a finely divided slurry and being under a pressure greater than the equilibrium pressure of the solvent at the solution temperature, centrifugally separating an asphalt phase from the solution in the separating zone while maintaining a pressure on the contents of the separating zone greater than the equilibrium pressure of the solvent at its temperature in the separating zone by means of a gas having a higher vapor pressure than the solvent at the same temperature and being substantially insoluble in the solvent, passing the asphalt phase to a distillation zone, distilling the solvent from the asphalt and removing the solvent-free asphalt from the distillation zone.

7. The process of claim 6 wherein the solution contains a non-miscible fluid physically associated with the asphalt slurry so as to provide an extended surface area, said fluid being removed from the separating zone with the asphalt phase.

8. A process for dewaxing hydrocarbon oils comprising chilling a solution of waxy oil in a normally gaseous solvent under a pressure greater than the equilibrium pressure of the solvent at its temperature during chilling to secure a mixture formed of a crystallized wax phase and an oil phase, passing the chilled mixture to a separating zone, and there centrifugally separating the wax phase from the oil phase while maintaining a pressure on the contents of the separating zone greater than the equilibrium pressure of the solvent at its temperature in the separating zone by means of a gaseous fluid having a higher vapor pressure than the solvent at the same temperature.

9. A process such as defined by claim 8 including the step of subjecting the mixture passing to the separating zone to the pressure of a gaseous fluid having a vapor pressure higher than the solvent at the same temperature, said pressure being greater than the equilibrium pressure of the liquid at its temperature during passage to the separating zone.

10. A process for dewaxing hydrocarbon oils comprising passing a solution of waxy oil in a liquefied normally gaseous hydrocarbon solvent in indirect heat exchange with a chilling medium, maintaining a pressure on the solution during chilling greater than the equilibrium pressure of the solvent at its temperature during chilling, passing the chilled solution containing crystallized wax to a separating zone, maintaining a pressure on the contents of the separating zone greater than the equilibrium pressure of the solvent at its temperature in the separating zone by means of a gas having a vapor pressure higher than the solvent at the same temperature, centrifugally separating in said separating zone a crystallized wax phase from the oil solvent solution, passing the dewaxed oil solvent solution in indirect heat exchange with the waxy oil solution being chilled to act as a chilling medium, passing the dewaxed oil solvent solution to a distillation zone, distilling the solvent from the oil and separately removing the oil and solvent vapors from the distillation zone.

11. A process for improving the cold test and color characteristics of a hydrocarbon oil containing asphalt and wax comprising forming a solution of the oil in a normally gaseous solvent under a pressure greater than the equilibrium pressure of the solvent at its temperature during the solution forming step, centrifugally separating asphalt from the solution, chilling the asphalt-free solution under a pressure greater than the equilibrium pressure of the solvent at its temperature during the chilling operation to solidify wax contained therein, centrifugally separating in said separating zone the solidified wax from the chilled solution, maintaining a pressure on the solution during the centrifuging operation greater than the equilibrium pressure of the solvent at the temperature of the solution during each of these operations by means of a gaseous fluid having a vapor pressure higher than the solvent and removing an oil solution free of asphalt and wax from the wax centrifuging operation.

12. A process for improving the cold test and color of asphaltic and wax bearing oils comprising mixing an asphalt and wax bearing oil with only a sufficient amount of a normally gaseous solvent at such a temperature as will precipitate substantially all of the insoluble asphalt from the solution formed, passing the solution containing insoluble asphalt to a separating zone, subjecting the solution during its passage to the separating zone to a pressure greater than the vapor pressure of the solvent at its temperature during passage to the separating zone, centrifugally separating in said separating zone the asphalt from the oil solution, passing the asphalt free solution under a pressure greater than the equilibrium pressure of the solvent at its temperature during chilling in indirect heat exchange with a chilling medium to cause crystallization of the wax at a relatively elevated temperature, passing the chilled solution containing crystallized wax to a second separating zone, centrifugally separating in said second separating zone a crystallized wax phase from the solution, maintaining a pressure on the contents of the separating zones greater than the equilibrium pressure of the solvent at its temperature during the separating operations by means of a gaseous fluid having a vapor pressure higher than the solvent at the same temperature, separately removing the wax phase and the wax-free oil solution from the wax separating zone, passing the wax-free oil solution to a distillation zone, distilling the solvent from the oil solution and separately removing the solvent vapors and the wax-free oil from the distillation zone.

13. A process for dewaxing hydrocarbon oils comprising passing a solution of waxy oil in a liquefied normally gaseous hydrocarbon solvent in indirect heat exchange with a chilling medium, maintaining a pressure on the solution during chilling greater than the equilibrium pressure of the solvent at its temperature during chilling, passing the chilled solution containing crystallized wax to a separating zone, maintaining a pressure on the contents of the separating zone greater than the equilibrium pressure of the solvent at its temperature in the separating zone by means of a gas having a vapor pressure higher than the solvent at the same temperature, and centrifugally separating in said separating zone a crystallized wax phase from the oil solvent solution.

14. A process for improving the cold test and color of asphaltic and wax bearing oils comprising mixing an asphalt and wax bearing oil with only a sufficient amount of a liquefied normally gaseous solvent at such a temperature as will precipitate substantially all of the insoluble asphalt from the solution formed, passing the solution containing insoluble asphalt to a separating zone, subjecting the solution during its passage to the separating zone to a pressure greater than the vapor pressure of the solvent at its temperature during passage to the separating zone, centrifugally separating in said separating zone the asphalt from the oil solution, passing the asphalt-free solution under a pressure greater than the equilibrium pressure of the solvent at its temperature during chilling in indirect heat exchange with a chilling medium to cause crystallization of the wax at a relatively elevated temperature, passing the chilled solution containing crystallized wax to a second separating zone, centrifugally separating in said second separating zone a crystallized wax phase from the solution, maintaining a pressure on the contents of the separating zones greater than the equilibrium pressure of the solvent at its temperature during the separating operations by means of a gaseous fluid having a vapor pressure higher than the solvent at the same temperature, and separately removing the crystallized wax phase and the dewaxed oil solution from the wax separating zone.

MAURICE B. COOKE.
EARL PETTY.